(12) United States Patent
Baldischweiler

(10) Patent No.: US 11,983,592 B2
(45) Date of Patent: May 14, 2024

(54) METHOD FOR TESTING A CHIP CARD ELEMENT

(71) Applicant: GIESECKE+DEVRIENT MOBILE SECURITY GMBH, Munich (DE)

(72) Inventor: Michael Baldischweiler, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 18/015,039

(22) PCT Filed: Jul. 7, 2021

(86) PCT No.: PCT/EP2021/025247
§ 371 (c)(1),
(2) Date: Jan. 6, 2023

(87) PCT Pub. No.: WO2022/008099
PCT Pub. Date: Jan. 13, 2022

(65) Prior Publication Data
US 2023/0274119 A1 Aug. 31, 2023

(30) Foreign Application Priority Data

Jul. 9, 2020 (DE) ...................... 10 2020 004 144.2

(51) Int. Cl.
*G06K 19/077* (2006.01)
(52) U.S. Cl.
CPC . *G06K 19/07722* (2013.01); *G06K 19/07781* (2013.01)
(58) Field of Classification Search
CPC ....... G06K 19/07722; G06K 19/07781; G06K 19/02; G06K 19/07747; G06K 19/07749
See application file for complete search history.

(56) References Cited

U.S. PATENT DOCUMENTS

2012/0312879 A1 12/2012 Rolin et al.
2016/0011639 A1 1/2016 Ewing et al.
(Continued)

FOREIGN PATENT DOCUMENTS

EP 2779031 B1 5/2019
WO 2019245072 A1 12/2019

OTHER PUBLICATIONS

M. Gebhart, R. Neubauer, M. Stark and D. Warnez, "Design of 13.56 MHz Smartcard Stickers with Ferrite for Payment and Authentication," 2011 Third International Workshop on Near Field Communication, Hagenberg, Austria, 2011, pp. 59-64, doi: 10.1109/NFC.2011.14. (Year: 2011).*

(Continued)

*Primary Examiner* — Matthew Mikels
(74) *Attorney, Agent, or Firm* — Workman Nydegger

(57) ABSTRACT

A method is provided for testing a card body with a metallic core layer for a contactless or dual-interface chip card, and a method is provided for manufacturing a contactless or dual-interface chip card. The method involves testing the functionality of the card body before the chip module employed for testing, or a corresponding chip module, is fixed into the cavity of the card body. A card body having impurities, a partial closure or full closure in the slot of its metallic core layer fails the test and is not used at all for fixing the chip module and for the subsequent manufacturing steps.

15 Claims, 7 Drawing Sheets

(56) References Cited

U.S. PATENT DOCUMENTS

| | | |
|---|---|---|
| 2018/0339503 A1 | 11/2018 | Finn et al. |
| 2020/0151534 A1 | 5/2020 | Lotya et al. |
| 2021/0170735 A1 | 6/2021 | Nam et al. |

OTHER PUBLICATIONS

International Search Report from PCT Application No. PCT/EP2021/025247, dated Oct. 12, 2021.

* cited by examiner

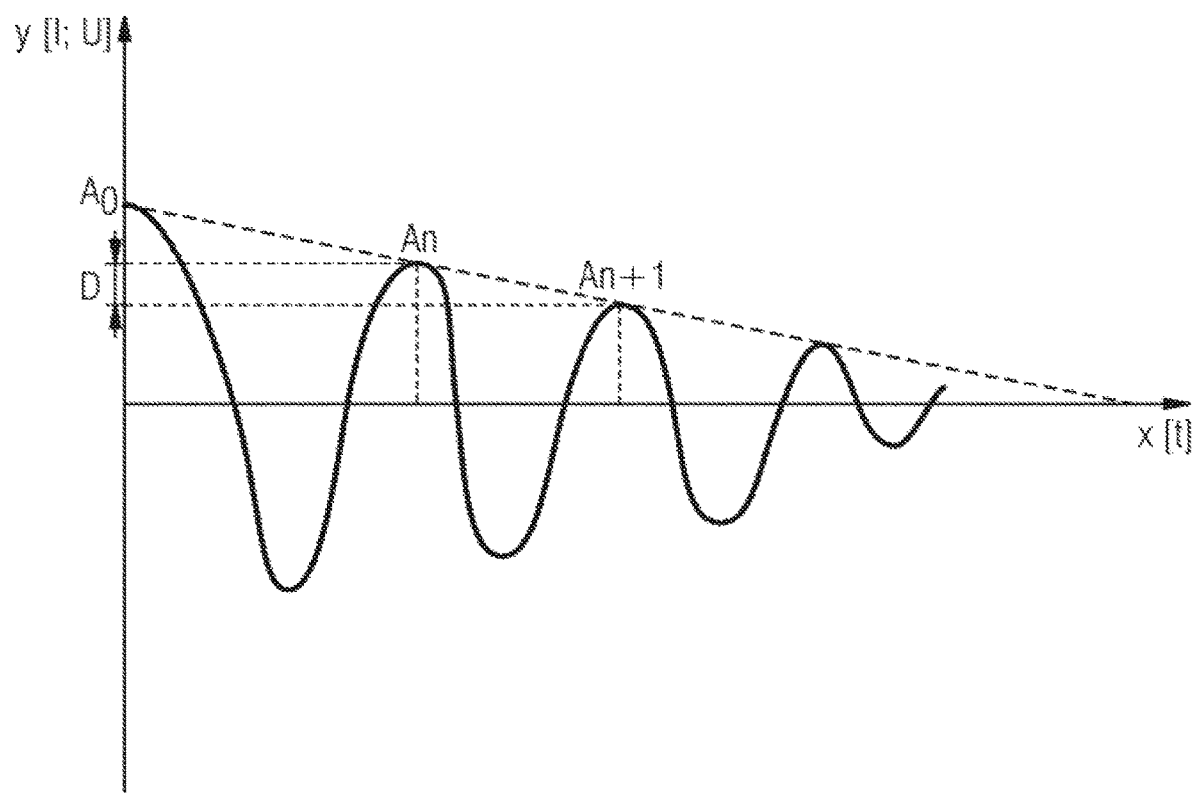

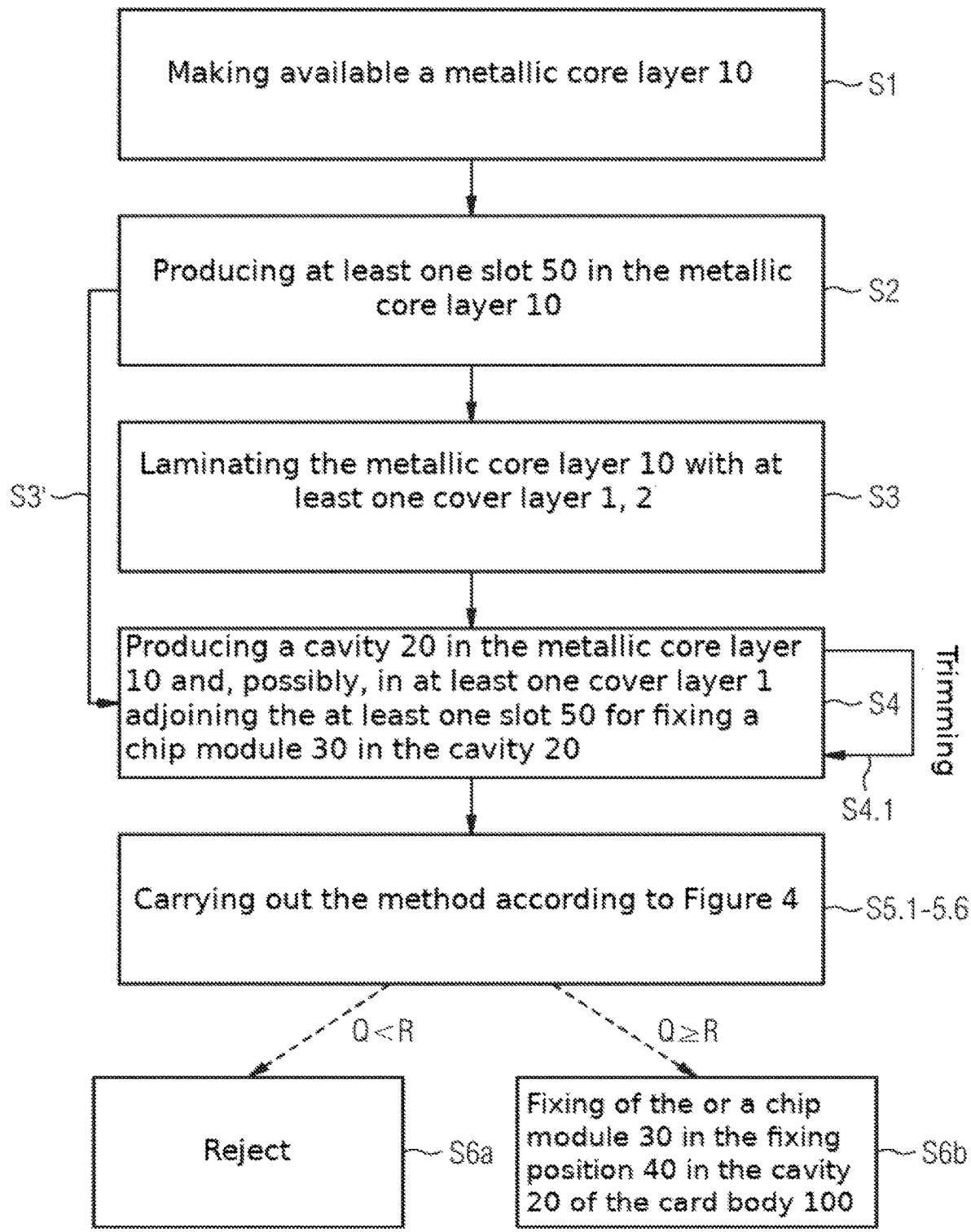

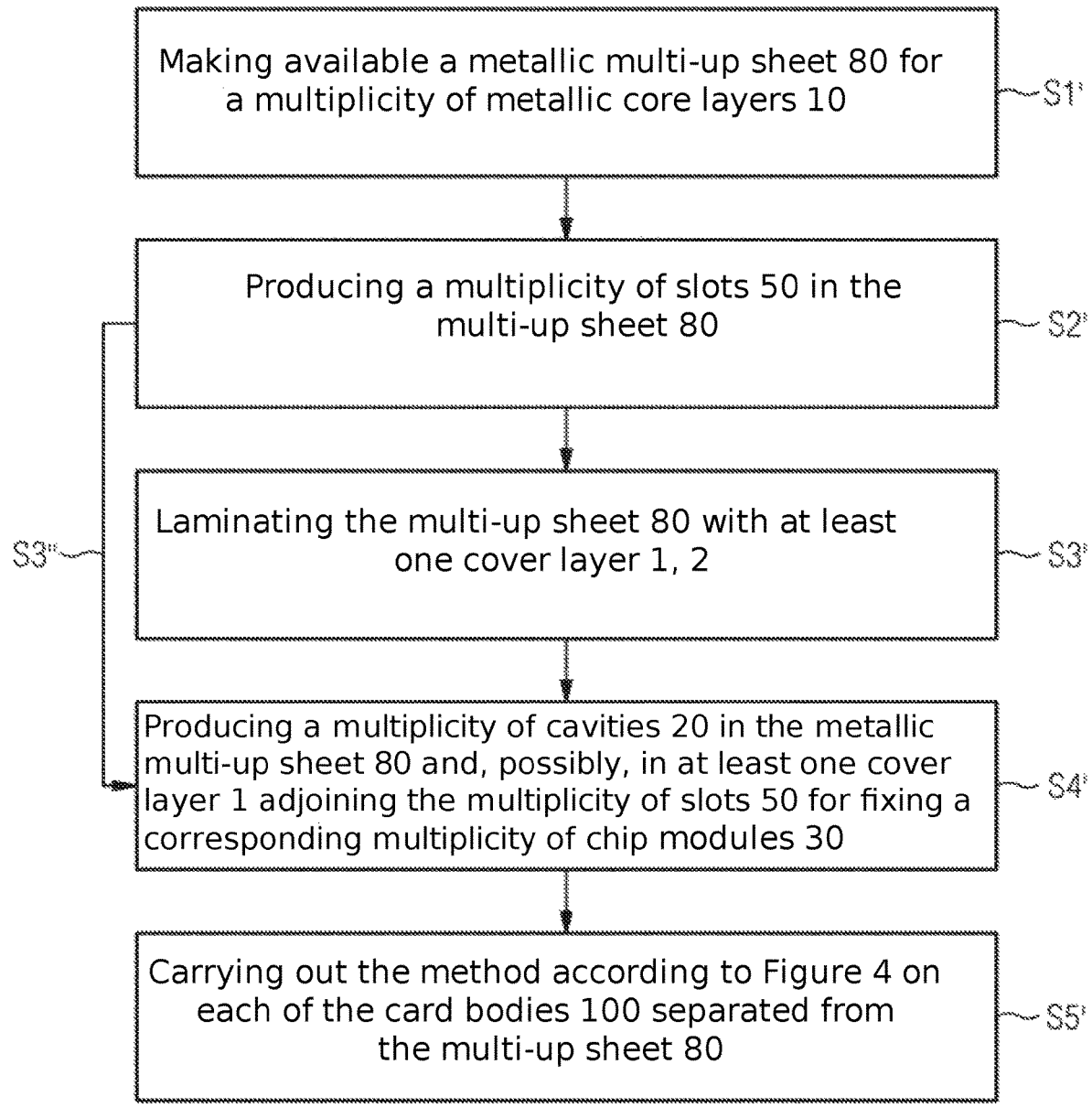

METHOD FOR TESTING A CHIP CARD ELEMENT

BACKGROUND

The present invention relates to a method for testing a card body with a metallic core layer for a contactless or dual-interface chip card and to a method for manufacturing a corresponding contactless or dual-interface chip card.

A contactless or dual-interface chip card comprises a card body, a chip and an antenna coil coupled to the chip. The antenna coil is located either in a chip module which comprises the chip or in the card body. A conventional card body is manufactured of thermoplastic material such as, for example, PVC, PET, PETG or ABS, but which materials are sometimes susceptible to cracks and fractures. For example, the chip card can break in a trouser pocket by torsion.

Compared to conventional card bodies, a card body with a metallic core layer has a heightened service life due to its relatively greater resistance to torsion. Furthermore, the metallic chip card has a high-quality and robust feel with respect to its weight. However, by integrating the metallic core layer into the card body, the contactless function of the chip card is substantially damped, so that the switching distance between the chip card and a card reader decreases. This is due to the fact that the metal material generally shields electromagnetic waves. This is because the energy transmitted by the card reader to the chip card by means of electromagnetic waves is partly absorbed and reflected by the metallic core layer. In particular, when the chip card is located in an alternating magnetic field of the card reader, electrons of the metallic core layer move around the chip module along a flow direction, so that an eddy current is created by the movement of the electrons. Through the resulting eddy current the transmitted energy is lost as heat on the one hand, which is also referred to as "absorbing", and an intrinsic magnetic field is produced on the other hand, which counteracts a change in the alternating magnetic field it has produced, which is also referred to as "reflecting". Since the transmitted energy is lost more or less through the eddy current, this has the result that the remaining energy which can actually be utilized by the chip module for contactless communication is correspondingly smaller than the transmitted energy, i.e. the switching distance has to be reduced due to the eddy current. If the remaining energy is smaller than a threshold value, for example 2 V, which is decisive for the switching of the chip module, the chip card does not function.

In order to counteract the damping effect of the metallic core layer, various manufacturing methods are known. US 2016/011639 A1 discloses a chip card which comprises on the one hand a chip module with a chip and a module antenna and on the other hand a metallic card body core layer with a cavity for receiving the chip module and a slot or nonconductive strip. The slot or nonconductive strip overlaps the module antenna and extends from the chip module to an outer edge of the metallic card body core layer. It serves to a certain extent to attenuate the above-mentioned damping effect and to increase the decreased switching distance by interrupting the flow of electrons of the metallic card body core layer. Since the originally closed eddy current circuit around the chip module is destroyed and no eddy current can occur any longer in the vicinity of the chip module, the energy available for the functionality of the chip module is correspondingly heightened. On the one hand, the slot should be as wide as possible to effectively prevent the eddy current, and on the other hand, the slot should be as narrow as possible with respect to the mechanical stability of the chip card. The slot can be cut by means of a laser, for example, or can be chemically etched. In order to reinforce the stability of the chip card, the slot can be filled at least partially with an electrically nonconductive polymer, epoxy resin or reinforcing epoxy resin.

What is important is that no metal material remains in the slot during cutting or etching. A remaining part of the metal material can cause a partial or even a full closure in the through-opening of the slot, which correspondingly lowers the effectiveness of the slot. The metallic card body core layer is regularly laminated with at least one further cover layer. During lamination, impurities or partial closure or even full closure can possibly again arise in the slot. Thus, it can occur that due to the high pressure an initially clean, thin slot is compressed by distortion and forms a contact. Such chip cards are then not functional. However, due to the presence of the cover layer, the slot is no longer accessible for inspection. Only during the final testing of the finished chip card is such a defect found.

Conventional methods for testing the contactless function of a contactless or dual-interface chip card with a thermoplastic card body comprise several steps, including an initial step for testing the chip module, for example according to EP 2779031 B1, and a final step for testing the end product, namely the chip card. When initially testing the chip module according to the method according to EP 2779031 B1, it is substantially checked whether the antenna coil of the chip module has a break and/or whether two or more windings of the antenna coil are accidentally short-circuited. Trials have shown that when testing the end product it is also possible to determine indirectly whether a partial or full closure has resulted in the slot of the metallic core layer of the card body, namely by checking the contactless function of the chip card once again. If the contactless function of the chip card is too weak, this can be attributed to a defective slot and the entire chip card is disposed of.

SUMMARY

The object of the present invention is to cut the manufacturing costs of contactless or dual-interface chip cards.

A basic idea of the present invention is to test the functionality of the card body before the chip module or a chip module is fixed in the cavity of the card body. A card body which has impurities, a partial closure or full closure in the slot of its metallic core layer fails the test and is not used at all for fixing the chip module and for subsequent manufacturing steps. Due to the preventive filtering out of all card bodies with defective metallic core layer, only functional card bodies are supplied with chip modules. Thus, as rejects there arise the card bodies with defective metallic core layer without chip modules and no longer card bodies with chip modules. Thus, costs caused by rejects can be cut.

According to a first aspect of the invention, the method begins with making available a card body with a metallic core layer, wherein the core layer has a cavity for fixing the chip module in a fixing position in the cavity and a slot extending from the cavity to an edge of the card body. The chip module comprises an oscillating circuit which comprises a chip, in particular an RFID or NFC chip, and an antenna coil coupled to the chip, in particular an inductively coupling and planar antenna coil having at least one winding. First, the chip module, which is to become part of the chip card later, or another chip module employed only for testing, is positioned in or above a fixing position in the cavity, preferably to a distance of 3 mm perpendicularly above the fixing position. The oscillating circuit is tested thereafter, i.e. before the chip module is actually fixed in the cavity.

The chip module is preferably connected to a measuring head of a test apparatus and can be positioned in or above the fixing position in the cavity by means of the measuring head. This makes it possible to work with existing chip module test apparatus which merely have to be adapted in such a manner that the chip module can be attached to the measuring head. Alternatively, the card body to be tested can be guided to the measuring head equipped with the chip module.

To test the functionality of the oscillating circuit of the chip module, the test apparatus can produce a single current pulse, preferably a direct current pulse in the form of the Dirac pulse, which correspondingly produces a pulsed magnetic field. This is because a stationary direct current could thermally overload the antenna coil of the chip module. By means of the pulsed magnetic field, the oscillating circuit of the chip module is excited contactlessly and begins to oscillate. Since the oscillating circuit of the chip module normally comprises resistance components through which energy losses occur, and the direct current pulse in the form of the Dirac pulse does not equalize the energy losses, the oscillation is actually a decaying oscillation. The oscillation can either correspond to a current or a voltage of the oscillating circuit, and the decay of the oscillation, i.e. the decay of the current or the decay of the voltage of the oscillating circuit, is detected by means of the test apparatus.

On the basis of the detected decay of the oscillation, a quality Q can be determined by means of the test apparatus. A high quality Q means a relatively slow velocity of the energy losses in the oscillating circuit and a relatively long duration of the decay of the oscillation. The quality Q can be ascertained from two successive oscillation amplitudes of the decay of the oscillation. The smaller a difference between the two successive oscillation amplitudes is, the greater is the quality Q. In order to detect the oscillation amplitudes of the decay, the test apparatus can comprise an integrated oscillograph which indicates the time profile of the decaying current or of the decaying voltage and/or at which the individual values can be read. The quality Q is advantageously compared with a known reference value which, for example, has been determined by means of a reference chip card or computed as an average value from the individual qualities of a multiplicity of chip cards. The reference chip card can likewise be a contactless or a dual-interface chip card with a metallic core layer which has an already determined slot through-opening. Finally, it is decided whether the chip module employed for testing or a corresponding chip module is to be fixed in the fixing position in the cavity. For example, the card body is not employed when the quality Q is smaller than the reference value. Otherwise, the chip module employed for testing or another chip module is fixed in the fixing position in the cavity. Beside or instead of the quality Q, different parameters such as e.g. a maximum switching distance, can be determined.

Test results have shown that the distance between the chip module and the fixing position in the cavity influences the decay of the oscillation and the quality Q and this influencing is linear up to a distance of 3 mm. This means that the functionality of the oscillating circuit can be tested relatively easily as long as the chip module is positioned no more than 3 mm relative to the fixing position, preferably perpendicularly above the fixing position, i.e. without the chip module having to be into the cavity.

The slot is preferably manufactured with a width of between 30 µm and 80 µm, more preferably between 50 µm and 80 µm. Subsequently, the metallic core layer is laminated with at least one cover layer, and finally the cavity is produced not only in the metallic core layer but also in the at least one cover layer. The cavity is introduced in such a manner that it adjoins the slot. If the slot does not yet reach up to an edge of the metallic core layer, the laminated metallic core layer is trimmed, for example by punching, such that the slot extends to an edge of the metallic core layer. The cover layer can be, for example, a transparent cover layer and/or a layer with a printed pattern and/or any other layer. In particular, it can have security features.

Instead of single metallic core layers, a metallic multi-up sheet can be made available for a multiplicity of contactless or dual-interface chip cards, wherein the metallic multi-up sheet comprises a corresponding multiplicity of metallic core layers in which a multiplicity of slots and a multiplicity of cavities are produced, such that each metallic core layer of the multiplicity of metallic core layers of the metallic multi-up sheet comprises at least one slot and one cavity, and in each metallic core layer the at least one slot extends from the corresponding cavity either to an edge of the metallic multi-up sheet or to at least one cutting line, along which the metallic core layer is separated from the metallic multi-up sheet in a further step.

Accordingly, after the metallic multi-up sheet has been laminated with at least one cover layer, the multiplicity of cavities can be created not only in the metallic multi-up sheet but also in the at least one cover layer.

A second aspect of the invention relates to the manufacture of a contactless or a dual-interface chip card while employing the test method according to the first aspect of the invention. A core of the second aspect of the invention is to first carry out the test method and, based on the test method carried out, to decide whether the chip module employed for testing or another chip module is to be fixed in the fixing position in the cavity. The card bodies that have failed the test are not admitted to the manufacturing method according to the second aspect of the invention, while only the card bodies that have passed the test undergo the further manufacturing method. This means that as rejects of the manufacturing method, there arise only card bodies without chip modules, but no longer card bodies with chip modules. Thus, costs caused by rejects can be cut.

BRIEF DESCRIPTION OF THE DRAWINGS

The present invention will hereinafter be described by way of example with reference to the attached drawings. The figures are described as follows:

FIG. 5 an oscillation curve showing the time profile of a decaying oscillation after excitation of an oscillating circuit of the chip module;

FIG. 6 steps of a manufacturing method including the test method of FIG. 4;

FIG. 8 steps of a test method for testing the functionality of card bodies separated from the multi-up sheet of FIG. 7A.

DETAILED DESCRIPTION OF VARIOUS EMBODIMENTS

Figure 1:
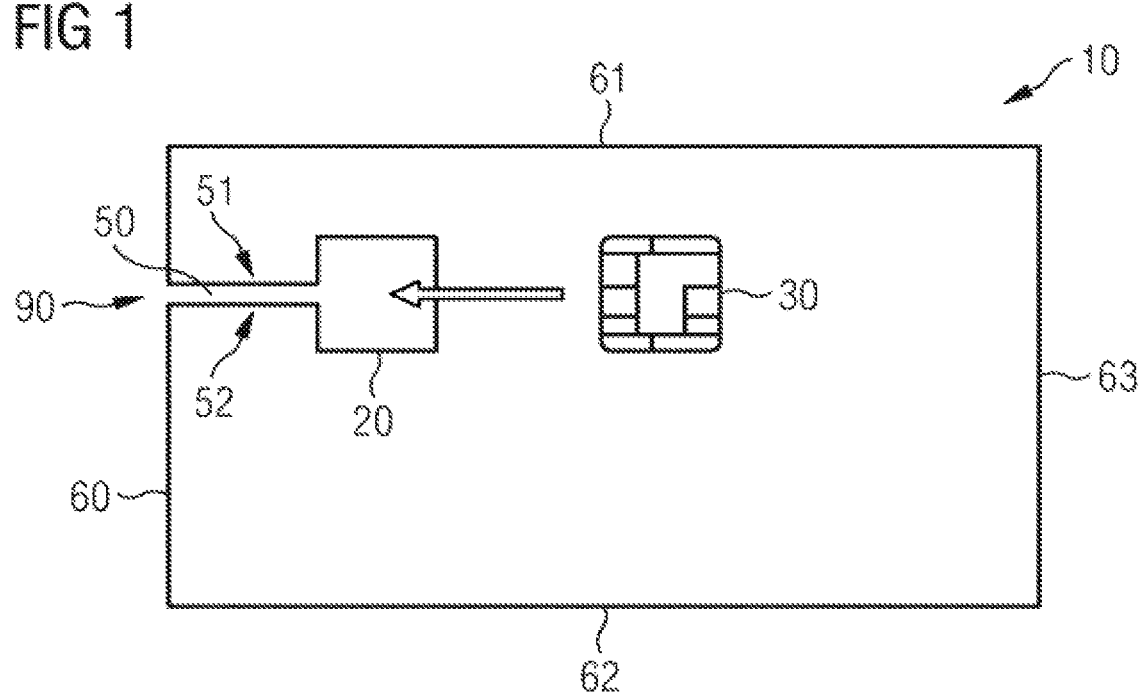
FIG. 1 a plan view of a metallic core layer and of a chip module for a contactless or dual-interface chip card to be inserted into the cavity of the metallic core layer.

FIG. 1 shows the plan view of a metallic core layer 10 for a contactless or dual-interface chip card. The metallic core layer 10 comprises a cavity 20 for fixing a chip module 30 in a fixing position 40 (see FIG. 3) in the cavity 20 and a slot 50 which extends from the cavity 20 to an edge 60 of the metallic core layer 10. The slot 50 has a through opening 90 over its entire length, in which the two walls 51, 52 of the slot 50 thus do not contact one another. Alternatively, the slot 50 can extend from the cavity 20 to one of the other three edges 61, 62, 63 of the metallic core layer 10. Deviating from FIG. 1, the length, depth, width, shape, direction and angle position between the slot 50 and an edge 60, 61, 62, 63 of the metallic core layer 10 and the number of slots can be varied as required. FIG. 1 likewise shows in plan view the chip module 30 to be inserted into the cavity, which comprises an oscillating circuit with a chip, preferably an RFID or NFC chip, and an antenna coil, preferably an inductively coupling and planar antenna coil with at least one winding.

Figure 2:
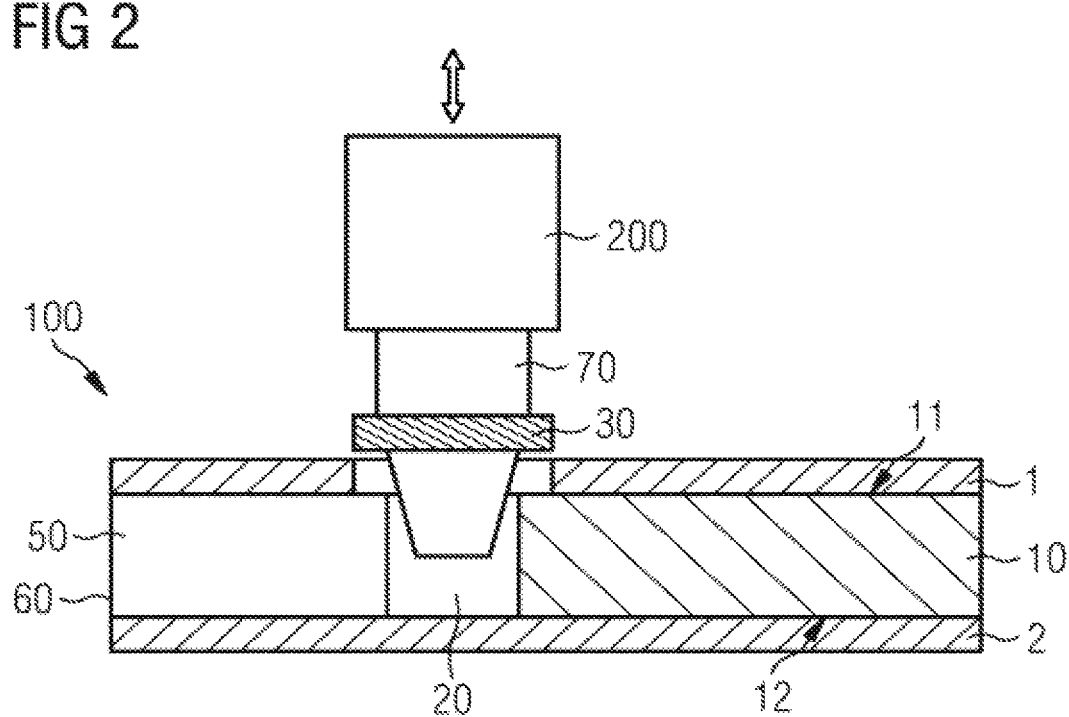
FIG. 2 a cross-sectional view of a card body for the contactless or dual-interface chip card, wherein the chip module is connected to a measuring head of a test apparatus.

FIG. 2 shows the cross-sectional view of a card body 100 which comprises the metallic core layer 10 according to FIG. 1 and two cover layers 1 and 2. The upper side 11 of the metallic core layer 10 is laminated with the cover layer 1, while the lower side 12 of metallic core layer 10 is laminated with the cover layer 2. Alternatively, only one or both cover layers 1 and 2 can be located on only one of the two sides 1 or 2 of the metallic core layer 10. Depending on the intended use, the number, position, thickness and material of the cover layers can be varied. Security features and/or an individual pattern can also be provided on and/or in the cover layers. FIG. 2 also shows the chip module 30 according to FIG. 1, which is connected to a measuring head 70 of a test apparatus 200 and is positioned by means of the measuring head 70 in or above the cavity 20 of the metallic core layer 10 and the cover layer 1. The slot 50 extends from the cavity 20 to the edge 60 of the card body 100 and is completely covered on both sides by the two cover layers 1 and 2.

Figure 3:
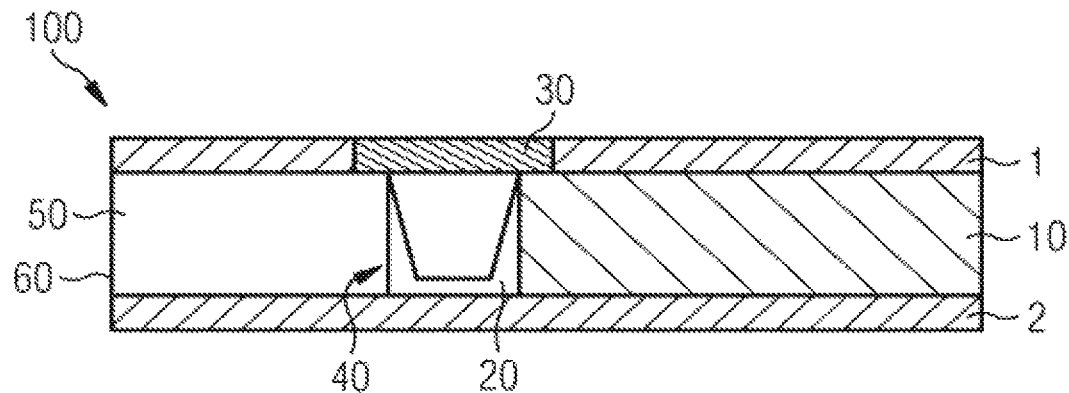
FIG. 3 a cross-sectional view of the card body according to FIG. 2, wherein the chip module is positioned in a fixing position in the cavity.

FIG. 3 shows the cross-sectional view of the card body 100 according to FIG. 2, wherein the chip module 30 is positioned here in the fixing position 40 in the cavity 20.

Figure 4:
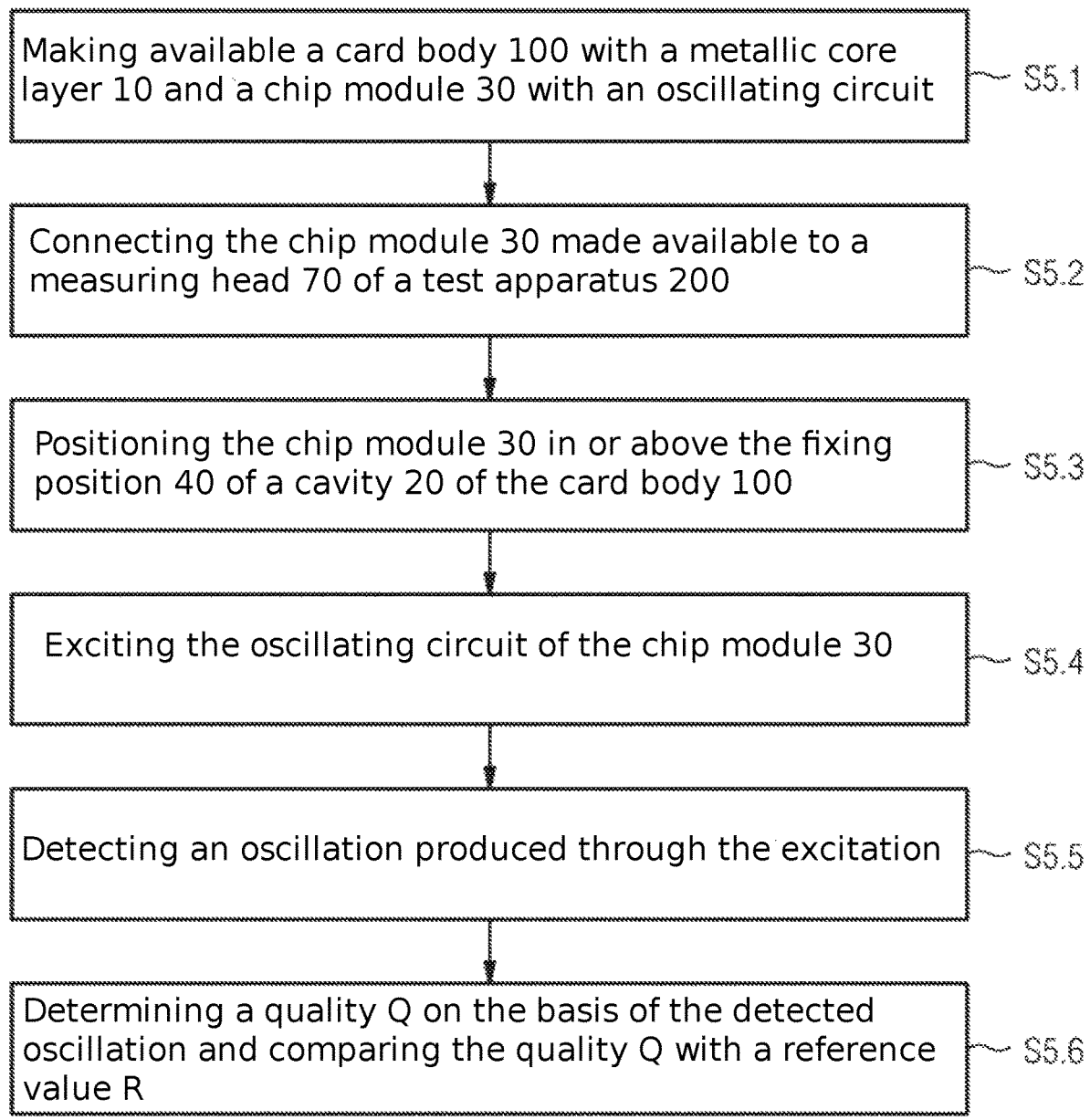
FIG. 4 steps of a test method for testing the functionality of the car body.

FIG. 4 shows the steps of the method for testing the functionality of the card body 100 when the chip module 30 according to FIG. 3 is positioned in the fixing position 40 in the cavity 20 or at a small distance of no more than 3 mm thereabove (see FIG. 2). The first three steps S5.1 to S5.3 according to FIG. 4 substantially correspond to FIGS. 1 to 3, i.e. first the card body 100 with the metallic core layer 10 and the chip module 30 employed for testing or another chip module 30 are made available (S5.1), thereafter the chip module 30 made available is connected to the measuring head 70 of the test apparatus 200 (S5.2), and then the connected chip module 30 is positioned in or above the fixing position 40 of the cavity 20 of the card body 100 (S5.3). In steps S5.4 to S5.6, the oscillating circuit of the chip module 30 positioned in this manner is excited (S5.4) and the oscillation produced by the excitation is detected by means of the test apparatus 200 (S5.5). For this purpose, the test apparatus 200 can comprise an oscillograph which can represent a corresponding oscillation curve which indicates the time profile of the decaying current or of the decaying voltage and/or at which the individual values of the current or of the voltage can be read. Finally, a quality Q is determined in step S5.6 and compared with a reference value R.

FIG. 5 shows the oscillation curve represented by means of the oscillograph. The horizontal axis X and the vertical axis Y of the oscillation curve correspond to the time t and the current I or the voltage U of the oscillating circuit of the chip module 30. As already mentioned, the detected oscillation is actually a decaying oscillation. This means that, over the course of time t, the current I or the voltage U of the oscillating circuit has a general downward trend, and the oscillation amplitude $A_{n+1}$ of a consecutive phase is always smaller than the oscillation amplitude $A_n$ of a preceding phase. The original and maximum oscillation amplitude $A_0$ of the decaying oscillation means the maximum current or maximum voltage of the oscillating circuit when the oscillating circuit of the chip module 30 starts oscillating. The quality Q can be ascertained e.g. from a difference D of two successive oscillation amplitudes $A_n$ and $A_{n+1}$ from two successive phases.

FIG. 6 relates to the preparation of the metallic core layer 10 of the card body 100 according to FIGS. 1 and 2. First, the metallic core layer 10 is made available (S1) in which at least the slot 50 is produced, which extends to the edge 60, 61, 62, 63 of the metallic core layer 10 (S2). The metallic core layer 10 is laminated (S3) with at least one of the two cover layers 1, 2. Subsequently, the cavity 20 is produced (S4) in the metallic core layer 10 and in at least one of the cover layers 1, 2. If no cover layers 1, 2 are laminated with the metallic core layer 10, the cavity 20 is produced only in the metallic core layer 10 (S3', S4). In this case, the cavity 20 is produced in such a manner that it adjoins the at least one slot 50. If the slot 50 does not extend to the edge 60, 61, 62, 63 of the metallic core layer 10, the card body 100 is trimmed such that the at least one slot 50 extends to the edge 60, 61, 62, 63 of the metallic core layer 10 (S4.1). Steps S5.1 to S5.6 are subsequently carried out according to the test method of FIG. 4. As a result, the quality Q is either smaller than the reference value R and the card body is rejected, as shown in step S6a of FIG. 6, or the quality Q is at least as great as the reference value R and the chip module 30 employed for testing or another chip module 30 is fixed in the fixing position 40 in the cavity 20, as shown in step 6b of FIG. 6.

Figure 7A:
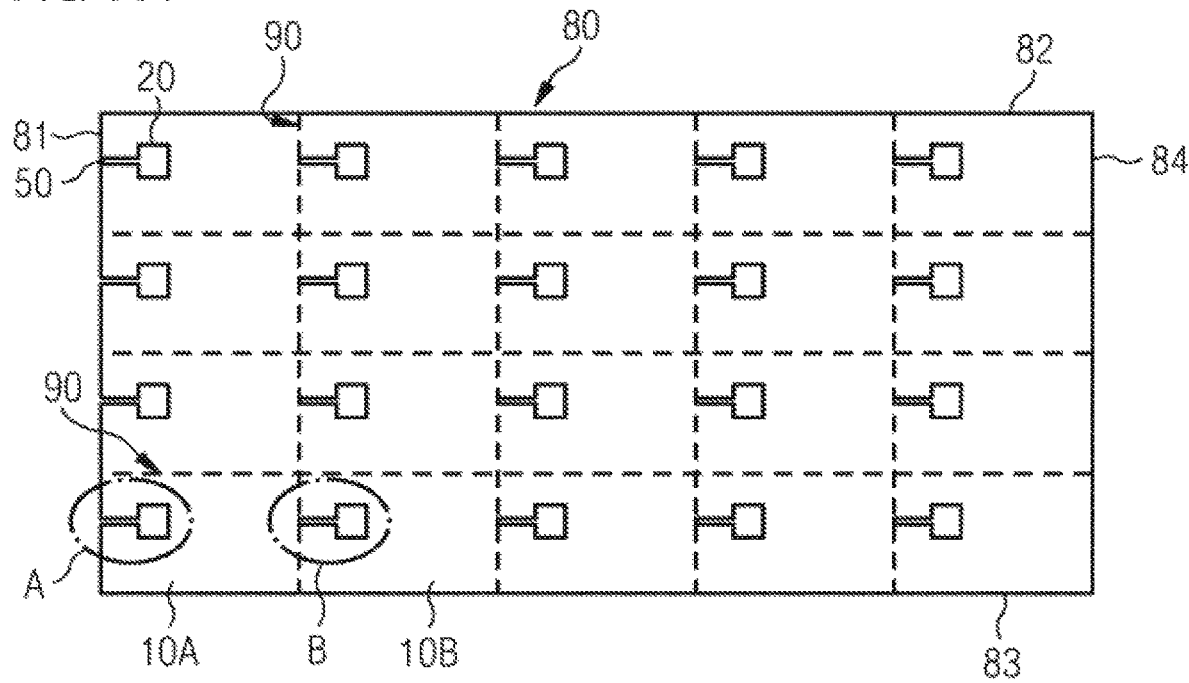
FIG. 7A a plan view of a metallic multi-up sheet for a multiplicity of metallic core layers for a corresponding multiplicity of contactless or dual-interface chip cards.

FIG. 7A shows the plan view of a metallic multi-up sheet 80 with a multiplicity of metallic core layers 10A, 10B for a corresponding multiplicity of contactless or dual-interface chip cards. Each metallic core layer 10 of the multiplicity of metallic core layers 10A, 10B comprises at least one slot 50 and one cavity 20. The multi-up sheet 80 has a quadrangular shape with two mutually opposite edges 82, 83 and 81, 84, respectively. In addition, the multi-up sheet 80 has a multiplicity of cutting lines 90 along which the multiplicity of metallic core layers 10A, 10B are separated from the multi-up sheet 80. The cutting lines 90, which are either parallel to the edges 82, 83 of the multi-up sheet 80 or parallel to the edges 81, 84 of the multi-up sheet 80, can be visible and/or virtual lines. Deviating from FIG. 7A, the number of the multiplicity of metallic core layers 10A, 10B can be varied as required.

Figure 7B:
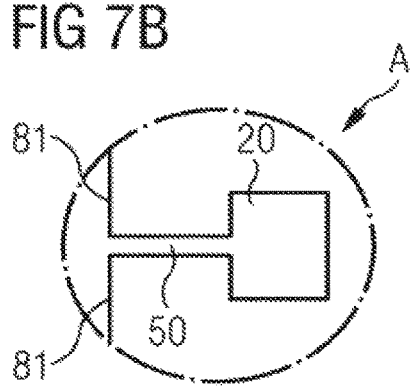
FIG. 7B a detail of a metallic core layer from FIG. 7A with a cavity for a chip module and a slot adjoining thereto, which extends to an edge of the multi-up sheet.
Figure 7C:
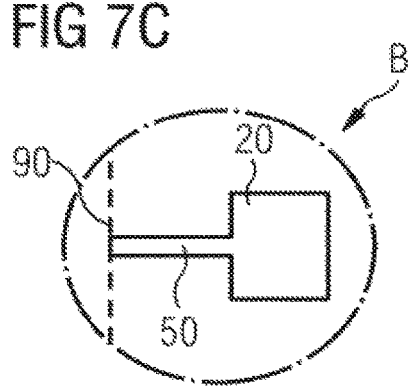
FIG. 7C a detail of another metallic core layer from FIG. 7A with a cavity for a chip module and a slot adjoining thereto, which extends to a cutting line.

FIGS. 7B and 7C respectively show a detail A and B, respectively of two different metallic core layers 10A, 10B of the multi-up sheet 80, wherein the first metallic core layer 10A adjoins one of the edges 81, 82, 83, 84 of the multi-up sheet 80 with its slot 50, while the second metallic core layer 10B does not adjoin one of the edges 81, 82, 83, 84 with its slot 50, but instead adjoins one of the cutting lines 90 of the multi-up sheet 80.

FIG. 8 shows a method for testing the functionality of card bodies 100 separated from the multi-up sheet 80 according to FIG. 7A. First of all, the metallic multi-up sheet 80 with the multiplicity of metallic core layers 10A, 10B is made available (S1'), and thereafter a corresponding multiplicity of slots 50 are produced in the multi-up sheet 80 (S2'). The metallic multi-up sheet 80 can be laminated with at least one cover layer 1, 2 (S3') as described above on the basis of a single card body 100, and subsequently a corresponding multiplicity of cavities 20 are produced in at least one of the cover layers 1, 2 and in the metallic multi-up sheet 80 (S4'). When no cover layers 1, 2 are laminated with the metallic multi-up sheet 80, the multiplicity of cavities 20 are formed only in the multi-up sheet 80 (S3", S4'). Preferably, each metallic core layer 10 of the multiplicity of metallic core layers 10A, 10B of the metallic multi-up sheet 80 comprises at least one slot 50 and one cavity 20 produced such that the slot 50 extends from the cavity 20 to either an edge 81, 82, 83, 84 of the metallic multi-up sheet 80, as shown in FIG. 7B, or to a cutting line 90 of the metallic multi-up sheet 80 as shown in FIG. 7C. Finally, the steps S5.1 to S5.6 according to FIG. 4 are carried out on each card body 100 separated from the multi-up sheet 80.

The invention claimed is:

1. A method for testing a card body with a metallic core layer for a contactless or a dual-interface chip card, comprising the steps of:
    making available the metallic core layer with a cavity for fixing a chip module in a fixing position in the cavity and with at least one slot which extends from the cavity to an edge of the metallic core layer;
    making available the or a chip module with an oscillating circuit which comprises a chip and an antenna coil coupled to the chip;
    positioning the chip module made available in the cavity in or above the fixing position; and
    testing the oscillating circuit of the positioned chip module before a fixing of the chip module in the cavity.

2. The method according to claim 1, wherein the step of positioning comprises the following substep of:
    connecting the chip module to a measuring head of a test apparatus.

3. The method according to claim 2, wherein, in the step of positioning, the chip module is positioned by means of the measuring head.

4. The method according to claim 1, wherein, in the step of positioning, the chip module is positioned in the cavity in or above the fixing position up to a distance of 3 mm relative to the fixing position.

5. The method according to claim 1, wherein the testing step comprises the following substeps of:
    exciting the oscillating circuit by means of a test apparatus; and
    detecting an oscillation of the oscillating circuit produced through the excitation.

6. The method according to claim 5, wherein the excitation step is carried out by inductive excitation by means of a pulsed magnetic field.

7. The method according to claim 6, wherein the pulsed magnetic field is produced by a single current pulse, by a direct current pulse in the form of a Dirac pulse.

8. The method according to claim 5, wherein a decay of the oscillation is detected in the detection step.

9. The method according to claim 8, wherein the detecting step comprises the following substeps of:
    determining a quality Q on a basis of the decay of the oscillation and comparing the quality Q with a reference value.

10. The method according to claim 1, wherein the step of making available the metallic core layer comprises the substeps of:
    making available the metallic core layer;
    producing the at least one slot in the metallic core layer;
    laminating the metallic core layer with at least one cover layer;
    producing the cavity in the at least one cover layer and the metallic core layer, so that the at least one slot adjoins the cavity; and
    if the at least one slot does not extend to an edge of the metallic core layer, trimming the laminated metallic core layer such that the at least one slot extends to an edge of the metallic core layer.

11. The method according to claim 1, wherein the step of making available the metallic core layer comprises the substeps of:
    making available a metallic multi-up sheet for a multiplicity of contactless or dual-interface chip cards, wherein the metallic multi-up sheet comprises a corresponding multiplicity of metallic core layers;
    producing a multiplicity of slots in the metallic multi-up sheet, such that each metallic core layer of the multiplicity of metallic core layers of the metallic multi-up sheet comprises at least one slot;
    producing a multiplicity of cavities in the metallic multi-up sheet for fixing a corresponding multiplicity of chip modules therein,
    wherein each metallic core layer of the multiplicity of metallic core layers of the metallic multi-up sheet comprises a cavity and, in each metallic core layer, the at least one slot extends from the corresponding cavity either to an edge of the metallic multi-up sheet or to at least one cutting line along which the metallic core layer will be separated from the metallic multi-up sheet; and
    separating the multiplicity of metallic core layers from the metal multi-up sheet.

12. The method according to claim 11, wherein the step of making available the metallic core layer comprises the further substeps of:
    laminating the metallic multi-up sheet with at least one cover layer;
    producing a multiplicity of cavities in the at least one cover layer and the metallic multi-up sheet for fixing a corresponding multiplicity of chip modules therein.

13. The method for manufacturing a contactless or a dual-interface chip card, comprising the following steps of:
    carrying out the method according to claim 1; and later fixing the chip module or a chip module in the fixing position in the cavity.

14. The method according to claim 1, wherein the antenna coil is an inductively coupling antenna coil, with at least one winding.

15. The method according to claim 1, wherein the chip is an RFID or an NFC chip.

* * * * *